United States Patent [19]

Siegel

[11] Patent Number: 4,998,295
[45] Date of Patent: Mar. 5, 1991

[54] RECEIVER HAVING AN INTERFEROMETER

[75] Inventor: Stefan A. Siegel, Fogelsville, Pa.

[73] Assignee: General Electric Company, Schenectady, N.Y.

[21] Appl. No.: 292,041

[22] Filed: Dec. 30, 1988

[51] Int. Cl.⁵ .............................................. G02F 1/00
[52] U.S. Cl. .................................... 455/619; 455/611; 455/615; 455/616; 455/608; 356/345; 356/349; 370/3; 350/96.16
[58] Field of Search ............... 455/619, 616, 615, 611, 455/605, 600, 608; 356/345, 346, 349; 370/3; 350/96.16

[56] References Cited

U.S. PATENT DOCUMENTS

| | | | |
|---|---|---|---|
| 4,019,048 | 4/1977 | Maione et al. | 250/199 |
| 4,257,125 | 3/1981 | Theall, Jr. | 455/608 |
| 4,257,126 | 3/1981 | Theall, Jr. | 455/608 |
| 4,262,366 | 4/1981 | Eumurian | 455/612 |
| 4,562,582 | 12/1985 | Tokura et al. | 375/87 |
| 4,718,120 | 1/1988 | Tzeng | 455/619 |
| 4,817,206 | 3/1989 | Calvani et al. | 455/619 |
| 4,868,894 | 9/1989 | Gilden et al. | 455/617 |

Primary Examiner—Donnie L. Crosland
Attorney, Agent, or Firm—James Magee, Jr.; James C. Davis, Jr.

[57] ABSTRACT

A receiver for a burst Manchester encoded composite optical digital signal has an interferometer comprising two fiber optic transmission lines. The lines differ in length so that they have time delays that differ by the period of the sync signal. Thus, the interferometer extracts the sync signal from the composite signal. The sync signal and a data signal are detected by photodiodes.

12 Claims, 1 Drawing Sheet

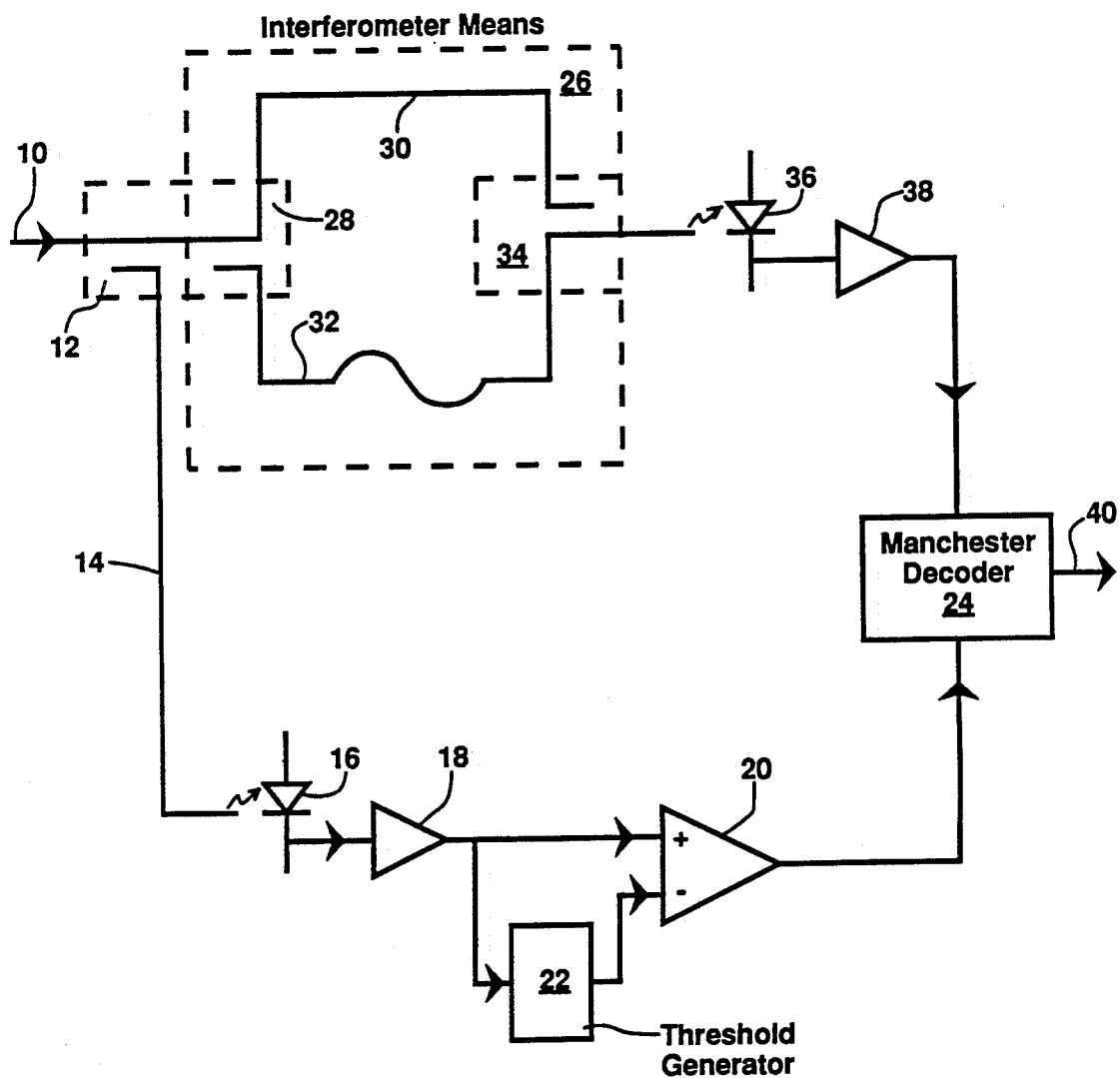

RECEIVER HAVING AN INTERFEROMETER

BACKGROUND OF THE INVENTION

The present invention relates to a receiver having an interferometer, and more particularly, to a fiber optic data receiver having an interferometer to select a synchronization (sync) signal.

In fiber optic local area networks wherein data is transmitted in bursts, clock signal recovery and data synchronization is difficult due to the short duration of the bursts. In particular, if the data is Manchester encoded with the data signal at a frequency $f_o$, then the sync signal is as a frequency $2f_o$. A typical prior art technique for extracting the sync signal is to bandpass filter the received signal at $2f_o$, or if a preamble at $2f_o$ is sent, threshold detect it and use the detected preamble to excite a ringing tank circuit oscillator at $2f_o$. In either case, disadvantages include low signal-to-noise ratio (SNR), jitter, distortion due to threshold detection, and loss of at least a portion of the preamble due to time constant effects in a threshold detector, all caused by the short duration of the signal.

It is, therefore, desirable to have a receiver that recovers a sync signal, especially wherein the data signal occurs in bursts, that has a high SNR, low jitter, low distortion and low loss of preamble.

SUMMARY OF THE INVENTION

A receiver in accordance with the invention for a composite signal having an information signal component at a first selected frequency and a synchronization signal component at a second selected frequency comprises an interferometer means for receiving said composite signal and for selecting said second selected frequency; means for detecting said synchronization signal coupled to said interferometer means; and means for receiving said composite signal and for detecting said information signal at said first selected frequency.

BRIEF DESCRIPTION OF THE DRAWING

The sole figure block diagram of an embodiment of the invention.

DETAILED DESCRIPTION OF THE PREFERRED EMBODIMENTS

As shown in the FIGURE, a fiber optic cable 10 conveys a composite optical signal having an information signal component at a first selected frequency ($f_o$) and a sync or clock signal component at a second selected frequency. Typically, the composite signal is a digital signal that occurs in bursts and the second frequency is an integer multiple of the first frequency. Manchester encoding can be used wherein said multiple is two, i.e., the second selected frequency is $2f_o$. The composite signal is applied to an optical coupler 12 having one output applied to a fiber optic cable 14. In turn the cable 14 applies the optical signal to a means for converting an optical signal to an electrical signal or optical detector, such as a photodiode 16. Biasing circuits for the diode 16 are not shown as they are well known in the art. The resulting electrical signal is applied to a broadband amplifier 18. The amplified signal is applied to the positive input of a comparator, such as a differential amplifier 20, and also to a threshold generator 22, such as an integrator with a time constant of about 15 to 20 ns followed by a peak detector (neither shown), both as known in the art. The peak detector is not required, but provides a more stable reference level. The threshold level output signal from the threshold generator 22 is applied to the negative input of the comparator 20. Whenever the composite signal at the positive input exceeds the threshold level signal at the negative input, the comparator 20 provides an output signal. Thus, a degree of noise immunity is provided. Elements 20 and 22 together comprise a threshold detector. The output signal from the comparator 20 is then applied to an input of a Manchester decoder 24, as known in the art. Elements 14, 16, 18, 20, and 22 comprise a means for receiving the composite signal and for detecting the information signal. The cable 10 and coupler 12 may be considered as a receiver input means.

The other output of the coupler 12 is applied to an interferometer means 26 comprising means for splitting the composite signal into two equal strength signals, such as a 3 dB optical directional coupler 28. One output signal of the coupler 28 is applied to a transmission line (defining a first signal path, such as an optical fiber 30 of a first selected length and, thus, a first selected time delay. The other output signal from the coupler 28 is applied to a transmission line (defining a first signal path), such as an optical fiber 32 of a second selected length and, thus, a second selected time delay longer than said first selected time delay by the period of the sync signal, i.e., $1/2f_o$.

This difference between the first and delays can be calculated from the formula $n_e \Delta L$ wherein second selected time $n_e$ = the effective index of refraction, $\Delta L$ = the length difference between the transmission lines 32 and 30 and c = the velocity of light in free space. The output signals from the lines 32 and 30 are applied to a means for equally combining (i.e. adding) the output signals of the lines 32 and 30, such as an optical 3 dB directional coupler 34, which is part of the interferometer 26.

Due to the phasing of the two signals applied to the coupler 34, the output signal therefrom will comprise signals having frequencies of about $2f_o$ (the sync signal component) and even order harmonics thereof. In particular, signals having frequencies of $f_o$ (the information signal component) and odd order harmonics thereof will be suppressed. The output signal from the coupler 34 is applied to a photodiode 36. The electrical signal from the diode 36 is applied to a narrow band amplifier 38 having a center frequency of about $2f_o$. Thus, the even order harmonics of $2f_o$ are filtered out and SNR is improved. Although the amplifier 38 is a narrow band amplifier, it is wider than that of a typical prior art amplifier which does not have the interferometer 26 to suppress $f_o$ and odd order harmonics thereof. Thus, ringing and jitter are reduced, SNR is increased, and since no threshold detector is used to detect the sync signal, no distortion or loss of preamble occurs. These advantages are especially apparent $f_o$ r a high data speed application. The output signal from the amplifier 38 is applied to the remaining input of the decoder 24. Decoded data is present at the output 40 of the decoder 24.

It will by appreciated that other embodiments are possible within the spirit and scope of the invention. For example, the input signal can comprise an electrical one. In this case, the lines 10, 14, 30, and 32 would comprise electrical conductors, the couplers 12, 28, and 34 would be electrical couplers, and diodes 16 and 36 would not be needed. Coding schemes other than Manchester could be used. In this case, the second selected (sync)

frequency could be an integer multiple other than two, or not even an integer multiple. Also, the input signal could be continuous or an analog signal.

What is claimed is:

1. A receiver for a composite signal having an information signal component at a first selected frequency and a synchronization signal component at a second selected frequency, said receiver comprising:
   a receiver input means for receiving said composite signal;
   an interferometer means for receiving said composite signal from said receiver input means and for selecting said second selected frequency and for suppressing said first selected frequency;
   means for detecting said synchronization signal coupled to said interferometer means; and
   means for receiving said composite signal coupled to said receiver input means to receive said composite signal therefrom and for detecting said information signal at said first selected frequency; and wherein said interferometer means comprises:
   means for splitting the composite signal into first and second signals;
   first and second signal paths, each having an input end, coupled to said splitting means, for receiving a corresponding one of the first and second signals, and an output end for providing an output signal;
   said first and second signal paths having first and second time delays, respectively, said delays differing such that said interferometer means will suppress said first selected frequency; and
   means, coupled to said output ends, for adding the output signals of said first and second signal paths.

2. The receiver of claim 1 wherein said means for splitting the composite signal splits the composite signal into first and second signals of equal strength, and wherein said first and second signal paths are respectively defined by first and second transmission lines, and wherein said delays differ by about the reciprocal of said second selected frequency.

3. The receiver of claim 2 wherein each of said transmission lines comprises an optical fiber.

4. The receiver of claim 2 wherein said transmission lines differ in length.

5. The receiver of claim 2 wherein said splitting means and said combining means each comprise a directional coupler.

6. The receiver of claim 1 wherein said composite signal comprises an optical signal.

7. The receiver of claim 1 wherein said composite signal comprises a digital burst signal.

8. The receiver of claim 1 wherein said second selected frequency is an integer multiple of said first selected frequency.

9. The receiver of claim 8 wherein said multiple is two.

10. The receiver of claim 1 wherein said receiving and detecting means comprises a threshold detector.

11. A receiver $f_o$ r a digital optical Manchester encoded composite burst signal having a data signal component at a frequency $f_o$ and a synchronization signal component at a frequency $2f_o$, said receiver comprising:
    a first optical directional coupler means for receiving the composite signal and for providing at two outputs equal strength signals;
    a pair of fiber optic transmission lines, each having input ends coupled to said coupler means outputs, respectively, and having a time delay difference therebetween of about $1/2f_o$ and an output end;
    a second optical directional coupler means having inputs coupled to said output ends, respectively, and an output;
    a first photodiode optically coupled to said second coupler means output;
    a narrow band amplifier having an input coupled to said photodiode, a center frequency of about $2f_o$, and an output providing said synchronization signal component;
    a second photodiode receiving said composite signal;
    a threshold detector having an input coupled to said second photodiode and an output providing said data signal component: and
    a Manchester decoder having a pair of inputs respectively coupled to said narrow band amplifier output and to said threshold detector output, and an output means for providing decoded data.

12. The receiver of claim 11 wherein said threshold detector comprises a threshold generator having an input coupled to said second photodiode and an output; and a comparator having a pair of inputs respectively coupled to said threshold generator output and to said second photodiode, and an output coupled to said decoder.

* * * * *